March 27, 1962 C. J. MAY, JR 3,027,524

SIGNAL TRANSMISSION GATE

Filed Aug. 21, 1959

INVENTOR
C. J. MAY, JR.
BY R. O. Nimz
ATTORNEY

United States Patent Office 3,027,524
Patented Mar. 27, 1962

3,027,524
SIGNAL TRANSMISSION GATE
Carl J. May, Jr., Warren Township, Somerset County, N.J., assignor to Bell Telephone Laboratories, Incorporated, New York, N.Y., a corporation of New York
Filed Aug. 21, 1959, Ser. No. 835,322
13 Claims. (Cl. 333—7)

This invention relates to signal coupling circuits using semiconductor devices and, more particularly, to constant impedance signal transmission gates.

In many high speed signal translating systems, it is necessary to connect and disconnect a source of signals to and from translating circuits which are sensitive to impedance mismatches. Transmission lines and filters, for example, have characteristic input impedances which must be matched, at least approximately, to eliminate undesirable signal reflections. Otherwise such reflections impair the efficiency of the system and the fidelity with which signals are transmitted.

Many forms of signal gates are known which are designed to connect a signal source to a load. In general, these gate circuits provide an extremely high impedance between the connected circuits when they are in the open condition and provide an extremely low impedance when in the closed condition. This large shift in impedance levels is the basis of the switching action. It is evident, however, that such large impedance shifts normally would make it impossible to present an impedance match to the connected circuits in both the closed and the open condition. Undesirable loss of signal strength and fidelity therefore normally result from using these gate circuits with impedance-sensitive networks.

It is an object of the present invention to improve the characteristics of coupling networks interposed between intermittently coupled signal translation circuits.

It is another object of the invention to reduce or substantially eliminate signal-distorting reflections in intermittently utilized signal translation circuits.

It is a more specific object of the invention to match the impedance of a signal transmission gate to the connected signal translation circuits when the transmission gate is in both the open and the closed conditions.

In accordance with the present invention, these and other objects may be achieved by a signal transmission gate which includes at least two switching elements. Each of these switching elements is adapted to be placed in a high impedance condition, called the Off condition, or a low impedance condition, called the On condition, in response to suitable control signals. A first one of these switching elements is interposed in series with the two signal translating circuits which are to be connected. The other one of these switching elements is connected in a circuit which is in shunt with the signal translating circuit which is sensitive to impedance mismatches. Also connected in this shunt circuit is a balancing impedance network having the same characteristic impedance as the impedance-sensitive signal translation circuit. The two switching elements are arranged such that when one is On, the other is Off.

It can be easily seen that the gate circuit described above will provide a matching impedance for the connected impedance-sensitive translating circuit in both the closed condition and in the open condition. In the closed condition, the first switching element is in the On condition and the sensitive network is connected through this switching element to the other signal translation circuit. Normal design considerations will dictate that these two networks have matching impedances when connected together in this manner.

When the gate circuit is in the open condition, the first switching element is in the Off condition and the two translating circuits are effectively disconnected from each other. Under this condition, however, the second switching element is in the On condition and serves to connect the balancing impedance, which also matches the sensitive translating circuit in impedance, across the input terminal of the gate circuit. This balancing impedance then serves as a reflectionless termination for the impedance-sensitive circuit. When the gate circuit is closed, the second switching element is in the Off condition and effectively disconnects the balancing impedance from the circuit.

In the preferred embodiments of the present invention, the switching elements comprise semiconductor devices such as transistors or semiconductor diodes. These elements are particularly suitable for this application because of their small size, low power consumption, and the small change in control voltages required to switch them between their Off and On conditions.

In accordance with the present invention, the switching elements are all driven from a common control voltage source which provides a single control voltage at a first level to open the gate circuit and at a second level to close the gate circuit. This makes possible the use of extremely simple and hence reliable control voltage sources to drive the gate circuits.

These and other objects and features, the nature of the present invention and its various advantages, will be more readily understood upon consideration of the attached drawing and of the following detailed description of the drawing.

Figure 1:
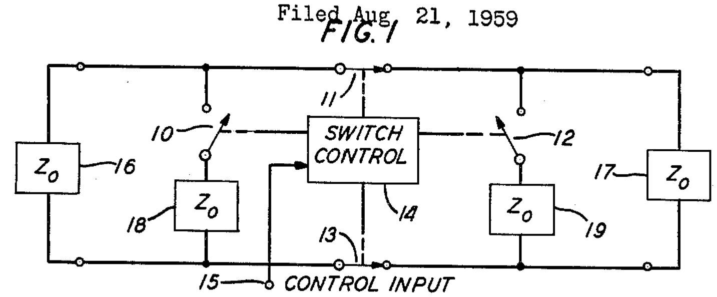
FIG. 1 is a block diagram of a signal transmission gate in accordance with the present invention.

Referring more particularly to FIG. 1, there is shown a block diagram of a signal transmission gate in accordance with the present invention comprising four separate switching elements 10, 11, 12 and 13. Each of these switching elements operates as a single-pole, single-throw switch and has therefore been so illustrated. Each of switching elements 10 through 13 is operated by a switch control circuit 14 which operates all of the switching elements in synchronism.

As illustrated in FIG. 1, the switching elements are grouped in two pairs. One pair is always in the closed condition when the other pair is in the open condition, and vice versa. Switching elements 11 and 13 have been illustrated as being in the closed condition and therefore switching elements 10 and 12 have been illustrated in the open condition. When switch control circuit 14 is energized by a control input of a first kind at terminal 15, for example, a positive voltage, switching elements 10 through 13 assume the conditions illustrated in FIG. 1. When a control signal of a second kind, for example, zero volts, is applied to terminal 15, switching elements 10 through 13 assume the condition opposite to that illustrated in FIG. 1. That is, switching elements 10 and 12 are closed and switching elements 11 and 13 are open.

Each of switching elements 11 and 13 are connected in series with one line of a two-line circuit interconnecting two signal transducing circuits 16 and 17. Circuits 16 and 17 may be of any one of many types found in signal processing systems which are characterized by a high degree of sensitivity to the impedance level of connected circuits. Transmission lines, filters and many types of active circuits, such as amplifiers and oscillators, fall into this class of circuits, at least to some degree. This class of circuits, in general, is characterized by an impedance function, $Z_0$, which must be matched, at least approximately, to secure a reasonable transfer of signal energy to and from the circuit. If this impedance is not matched, undesirable losses in both the power level and the fidelity of the signal occur.

It can be seen that switching elements 11 and 13 serve to connect circuits 16 and 17 together when in the closed condition and to disconnect circuits 16 and 17 when in the open condition. When in the closed condition circuits 16 and 17 are each connected to a circuit with matching impedance, i.e., to each other. Optimum signal transfer between circuits 16 and 17 therefore occurs when switching elements 11 and 13 are in the closed condition. When switching elements 11 and 13 are in the open condition, however, and circuits 16 and 17 are no longer connected together, they can no longer be used to match each other.

In accordance with the present invention, switching elements 10 and 12 are each connected in series with an impedance network having substantially the same characteristic impedance as circuits 16 and 17. Impedance network 18 is connected in series with switching element 10 across one side of switching elements 11 and 13. Impedance network 19 is connected in series with switching element 12 across the other side of switching elements 11 and 13. As described above, switching elements 10 and 12 are arranged to be closed when switching elements 11 and 13 are open. Hence when circuits 16 and 17 are disconnected from each other, circuit 16 is connected to impedance network 18 and circuit 17 is connected to impedance network 19. In this way, each of circuits 16 and 17 is connected at all times to a circuit having a matching impedance, regardless of which of the two switching conditions the various switching elements are in. In order to connect circuits 16 and 17 together, it is merely necessary to provide a proper control signal at terminal 15. In order to disconnect circuits 16 and 17, it is only necessary to change the control signal at terminal 15 to a specific different value. In either case, circuits 16 and 17 are terminated in the proper impedance.

Figure 2:
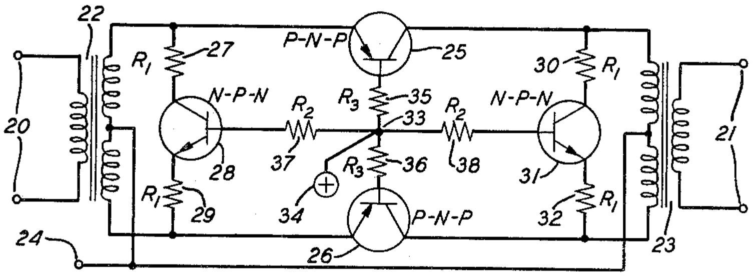
FIG. 2 is one embodiment of the signal transmission gate shown in block form in FIG. 1 and utilizing junction transistors.

Proceeding to FIG. 2 of the drawings, there is shown one specific embodiment of the circuit shown in block form in FIG. 1. The switching elements are electronic in nature to enable extremely rapid switching action. More particularly, each of the switching elements comprises a junction transistor having an emitter electrode, a collector electrode and a base electrode. Switching action is obtained by biasing the base electrode either beyond cutoff, thereby to establish an extremely high impedance between the emitter and collector electrodes, or into or near the saturation region, thereby to establish an extremely low impedance between the emitter and collector electrodes. This switching action is well known and will not be further described here.

Terminals 20 and 21 are provided as the external terminals of the gate circuit of FIG. 2 and to which may be connected impedance-sensitive circuits such as circuits 16 and 17 in FIG. 1. Terminals 20 are connected to the primary winding of a transformer 22 and terminals 21 are connected to the primary winding of transformer 23. Each of transformers 22 and 23 has a center-tapped secondary winding the center taps of which are connected together and brought out to a common control terminal 24. The upper ends of the secondary windings of transformers 22 and 23 are connected to the emitter and collector, respectively, of p–n–p transistor 25. Similarly, the lower ends of these secondary windings are connected to the emitter and collector, respectively, of p–n–p transistor 26. Transistors 25 and 26 serve as the series switching elements represented by elements 11 and 12 in FIG. 1.

Connected across the secondary winding of transformer 22 is the series combination of resistor 27, n–p–n transistor 28 and resistor 29. Similarly, connected across the secondary winding of transformer 23 is the series combination of resistor 30, n–p–n transistor 31 and resistor 32. Transistors 28 and 31 serve as the shunt switching elements represented by elements 10 and 12 in FIG. 1. Resistors 27, 29, 30 and 32 are all of equal value, $R_1$. Assuming that the impedance-sensitive circuits that are to be connected by the switching circuit of FIG. 2 are designed so as to have a characteristic impedance approximating a pure resistance at all frequencies of interest, the values of the resistances $R_1$ are given by $$R_1 = \frac{Z_0}{2} \qquad (1)$$

where $Z_0$ is the characteristic impedance of the circuits to be connected, and assuming that the turns ratios of transformers 22 and 23 are unity. If the turns ratios of these transformers are not unity, but are represented by $n$, the value of $R_1$ would then be given by $$R_1 = \frac{Z_0}{2n^2} \qquad (2)$$

It should be noted that if the characteristic impedance $Z_0$ is a complex quantity at the frequencies of interest, similar complex impedance networks may be substituted for resistors 27, 29, 30 and 32. These complex impedances would also be divided into two parts and adjusted by the square of the transformer turns ratios.

The base electrodes of each of the transistors 25, 26, 28 and 31 are connected to a point 33, maintained at a positive reference potential by source 34, through resistors 35, 36, 37 and 38, respectively. The values of resistors 35 and 36 are each equal to $R_3$ and the values of resistors 37 and 38 are each equal to $R_2$.

For the embodiment of the invention shown in FIG. 2, the control voltage applied to terminal 24 is either at zero volts, in which case the gate is open, or at a positive voltage greater than that supplied by source 34, in which case the gate is closed. When the voltage at terminal 24 is zero, the positive voltage at point 33 forward biases the base-emitter and base-collector junctions of n-p-n transistors 28 and 31. The voltage at point 33 divides across four similar parallel paths one of which includes resistor 37, the base-collector junction of transistor 28, resistor 27, and the upper half of the secondary winding of transformer 22 to the center tap on this winding and thus to terminal 24. Similar paths exist through the base-emitter junction of transistor 28 and through transistor 31.

The value of resistors 37 and 38 is chosen with respect to the maximum signal current to be encountered and to insure the biasing of the connected transistor junction well into the conduction region. Transistors 28 and 31 are therefore in the On condition when terminal 24 is grounded and present an extremely small impedance between their emitter and collector electrode. Resistors 27, 29, 30 and 32 are therefore effectively connected across the secondary windings of transformers 22 and 23, respectively, and serve as matching impedances which terminate the impedance-sensitive circuits connected to the respective primary windings.

With the voltage at terminal 24 at zero, the positive voltage at point 33 also serves to reverse-bias the base-emitter and base-collector junctions of transistors 25 and 26 which are of the p-n-p type, opposite to transistors 28 and 31. The voltage at point 33 divides across four more similar parallel paths one of which includes resistor 35, the base-emitter junction of transistor 25, and the upper half of the secondary winding of transformer 22 to the center tap on this winding and thus to terminal 24. Similar paths exist through the base-collector junction of transistor 25 and through transistor 26.

Transistors 25 and 26 are in the cut-off condition due to this reverse-bias and therefore present extremely high impedances between their respective emitter and collector electrodes. The circuits connected to the primary windings of transformers 22 and 23 are therefore effectively isolated from each other.

It can be seen that the application of ground potential to control terminal 24 simultaneously operates to place transistors 28 and 31 in a low impedance condition and to place transistors 25 and 26 in a high impedance condition. Under this condition, the gate circuit is open, the circuits connected to terminals 20 and 21 are disconnected from each other and each of these circuits is terminated in its characteristic impedance.

When the voltage at control terminal 24 is at a positive value greater than that provided by source 34, the effective voltage across each of the components in the circuit is reversed. That is, the base-emitter and base-collector junctions of n-p-n transistors 28 and 31 are reverse-biased while the base-emitter and base-collector junctions of transistors 25 and 26 are forward biased. The value of resistors 35 and 36 is also chosen with respect to the maximum signal current to be encountered and to insure the necessary biasing on transistors 25 and 26. Under this condition, transistors 28 and 31 are in a high impedance or Off condition and transistors 25 and 26 are in a low impedance or On condition. The gate circuit is then in the closed position, terminals 20 and 21 are connected together, and resistors 27, 29, 30 and 32 are effectively out of the circuit.

It will first be seen that interchanging the conductivity types of all of the transistors and reversing the voltages applied to the circuit does not affect the operation of the circuit. Zero volts at terminal 24 will still close the gate circuit and a negative voltage at terminal 24 lower than that at point 33 will open the circuit. The circuit is therefore easily adapted to either positive or negative driving signals.

It will be further noted that the only function of transformers 22 and 23 is to isolate the gate circuit components from the direct current voltage levels in the connected circuits. If these voltage levels can be otherwise controlled, transformers 22 and 23 may be omitted.

It is clear that the circuit of FIG. 2 is a symmetrical arrangement which will operate equally well for signal transfer in either direction, i.e., the gate circuit is bilateral. To further enhance this bilateral property, the various transistors may each be of the symmetrical type in which the collector and emitter electrodes are substantially identical. On the other hand, if only unilateral conduction is desired, the transistors may be highly directional in that transmission from collector to emitter is effectively blocked. Similarly, if impedances must be matched on only one side of the gate circuit, the shunt or n-p-n transistor, together with the connected balancing resistances, may be omitted on the other side of the gate circuit.

It can therefore be seen that, in accordance with the present invention, the circuit of FIG. 2 provides a bilateral, electronically-operated transmission type gate which presents a matching impedance to the connected circuits whether in the open or closed position. Furthermore, this gate is operated by a voltage at a single terminal. This control voltage may, for example, be provided by a manual switch connecting terminal 24 to ground potential or to a positive potential. More advantageously, the control voltage may be derived from well-known electronic circuits such as multivibrators, blocking oscillators or other types of pulse generators. In the latter case, the gate of FIG. 2 may be operated at an extremely rapid rate and thus find use in electronic switching systems for sampling, multiplexing or other high speed gating applications.

Figure 3:
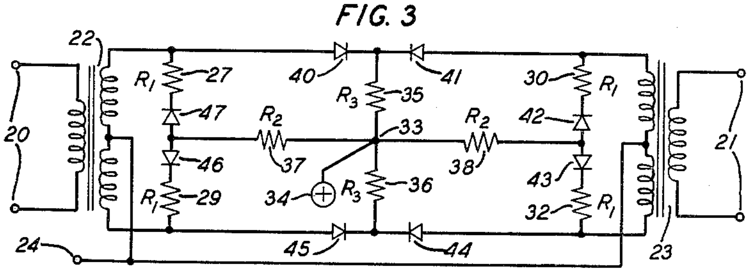
FIG. 3 is another embodiment of the invention shown in block form in FIG. 1 and utilizing semiconductor diodes.

The circuit of FIG. 3 is similar in many respects to that of FIG. 2. The same reference numerals have therefore been used in FIG. 3 to indicate corresponding elements. FIG. 3, however, does not include any transistors. Instead, FIG. 3 shows eight semiconductor junction diodes 40 through 47 which are used to perform the switching functions instead of transistors. Thus, when ground potential is applied to terminal 24, diodes 42, 43, 46 and 47 are forward biased by the positive potential at point 33. This forward biasing places these four diodes in the conducting or low impedance condition and thus effectively connect the balancing resistors 27, 29, 30 and 32 across the secondary winding of transformers 22 and 23. At the same time, this ground potential at terminal 24, together with the positive potential at point 33, serves to reverse-bias diodes 40, 41, 44 and 45. This reverse-bias places these latter four diodes in the nonconducting or high impedance condition and thus effectively isolates the two circuits connected to terminals 20 and 21.

When the voltage at terminal 24 is increased to a positive value greater than that supplied by source 34, the bias on all of the diodes is reversed. Diodes 42, 43, 46 and 47 are then in the high impedance or nonconducting state and effectively remove resistors 27, 29, 30 and 32 from the circuit. At the same time, diodes 40, 41, 44 and 45 are placed in the low impedance or conducting state, and effectively connect together the circuits connected to terminals 20 and 21.

The circuit of FIG. 3 therefore operates in essentially the same fashion as that in FIG. 2. The transistors of FIG. 2, however, may be arranged to provide some amplification to the signals transmitted through the gate.

It can be seen that reversing the polarity of all of the diodes of FIG. 3 and at the same time reversing the polarity of the voltages applied to the circuit does not affect the operation of the circuit. Diodes 40 through 47 are preferably silicon junction diodes to take advantage of the high breakdown voltages, low alternating current impedance and greater temperature stability of this material.

Figure 4:
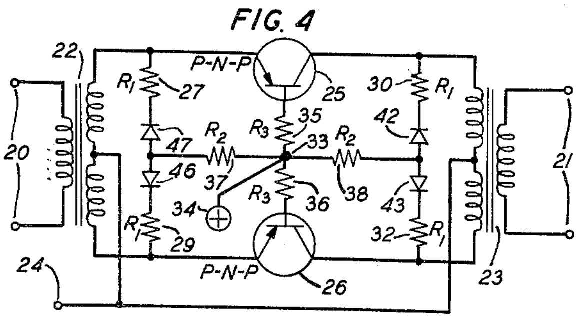
FIG. 4 is yet another embodiment of the invention utilizing a combination of transistors and semiconductor diodes.

In FIG. 4 there is shown another form of impedance-matching signal transmission gate which combines the switching elements of FIGS. 2 and 3. Again, the same reference numerals have been used to indicate corresponding elements. In FIG. 4, the series switching elements comprise p-n-p junction transistors 25 and 26 and the shunt switching elements comprise junction diodes 42, 43, 46 and 47. The circuit of FIG. 3 operates in a manner analogous to that of FIGS. 2 and 3. Ground potential at terminal 24 forward biases diodes 42, 43, 46 and 47 and reverse-biases the collector and emitter junctions of transistors 25 and 26. Under this condition the gate is open and the connected circuits terminated in their characteristic impedances. A positive potential greater than that of source 34 reverse-biases diodes 42, 43, 46 and 47 and forward biases the collector and emitter junctions of transistors 25 and 26. Under this condition, the gate is closed and circuits connected together. Reversing the conductivity types of the transistors, the polarity of the diodes and the polarity of the voltages again does not affect circuit operation.

It will be appreciated that each transition of the gate from one condition to the other requires an abrupt change in the voltage at terminal 24. This sharp voltage change in the secondary winding of transformers 22 and 23 will give rise to switching transients which would be undesirable in the connected circuits. If the two halves of these secondary windings are exactly matched, however, the switching transients will be balanced out and will not appear in the connected circuits. It is difficult and expensive, however, to build transformers with exactly matched windings, and hence transients may still exist.

Figure 5:
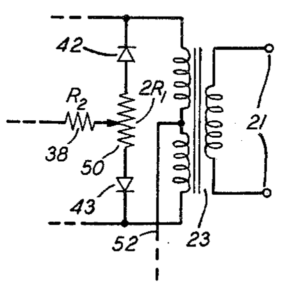
FIG. 5 is a transient balancing network which may be used in conjunction with any of the embodiments of FIGS. 2 through 4.

FIG. 5 shows one way in which the circuits of FIGS. 2 through 4 may be modified if some switching transient remains. Rather than being divided into two equal parts, the balancing resistance comprises a single resistor 50 having a value of $2R_1$ and provided with a movable tap 51. Resistor 38 is connected to tap 51 and diodes 42 and 43 are connected between the ends of resistor 50 and the corresponding ends of the secondary winding of transformer 23. Alternatively, control lead 52, connected to terminal 24 may be connected to the movable tap on a resistor inserted between the two halves of the secondary winding of transformer 23. In either case, transients may be balanced out merely by adjusting the tap on the resistor.

It is to be understood that the above-described arrangements are merely illustrative of the numerous and varied other arrangements which could represent applications of the principles of the invention. Such other arrangements may readily be devised by those skilled in the art without departing from the spirit and scope of the invention.

What is claimed is:

1. A signal transmission gate comprising a first pair of terminals exhibiting a first impedance therebetween, means for coupling each terminal of said first pair to one electrode of a respective one of a first two semiconductor signal translation devices, a second pair of terminals exhibiting a second impedance therebetween, means for coupling each terminal of said second pair to another electrode of the corresponding one of said first two semiconductor signal translation devices, first and second impedance means together equalling said first impedance and connecting the terminals of said first pair to first and second electrodes of a first one of a second two semiconductor signal translation devices, third and fourth impedance means together equalling said second impedance and connecting the terminals of said second pair to first and second electrodes of the second one of said second two semiconductor signal translation devices, means for applying the same reference potential to a third electrode of each of said first two and said second two semiconductor signal translation devices, and means for coupling a control potential to said first and second pairs of terminals.

2. The signal transmission gate according to claim 1 wherein each of said first two semiconductor signal translation devices comprises a junction transistor of a first conductivity type, and each of said second two semiconductor signal translation devices comprises a junction transistor of a conductivity type opposite to said first conductivity type.

3. The signal transmission gate according to claim 1 wherein each of said semiconductor signal translation devices comprises a pair of oppositely poled junction diodes.

4. The signal transmission gate according to claim 1 wherein at least one of said semiconductor signal translation devices comprises a junction transistor.

5. The signal transmission gate according to claim 1 wherein at least one of said semiconductor signal translation devices comprises a pair of oppositely poled junction diodes.

6. The signal transmission gate according to claim 1 wherein at least one of said semiconductor signal translation devices comprises a junction diode and at least one other of said semiconductor signal translation devices comprises a pair of oppositely poled junction diodes.

7. In combination, first and second transformers each having a primary and a center-tapped secondary winding, said secondary windings each exhibiting a given impedance thereacross, means for connecting a first pair of oppositely poled semiconductor junctions between one end of the secondary winding of said first transformer and one end of the secondary winding of said second transformer, means for connecting a second pair of oppositely poled semiconductor junctions between the other end of the secondary winding of said first transformer and the other end of the secondary winding of said second transformer, first impedance means substantially equal to said given impedance connecting a third pair of oppositely poled semiconductor junctions between the two ends of the secondary winding of said first transformer, second impedance means also substantially equal to said given impedance connecting a fourth pair of oppositely poled semiconductor junctions between the two ends of the secondary winding of said second transformer, a source of reference voltage for biasing the common junction between each of said pairs of oppositely poled semiconductor junctions, and means for applying a control voltage to the center taps of the secondary windings of said first and second transformers.

8. The combination according to claim 7 wherein said first and second pairs of semiconductor junctions are biased by said source of reference voltage in a non-conducting direction and said third and fourth pairs of semiconductor junctions are biased by said source of reference voltage in a conducting direction, said control voltage including a transition from a value below said reference voltage to a value above said reference voltage.

9. The combination according to claim 8 wherein each of said semiconductor junctions comprises a junction diode.

10. The combination according to claim 7 wherein said first and second pairs of semiconductor junctions each comprises a junction transistor of a first conductivity type, and said third and fourth pairs of semiconductor junctions each comprises a junction transistor of the conductivity type opposite to said first conductivity type.

11. In combination, a first and a second transformer each having a center-tapped secondary winding, each of said secondary windings reflecting a given characteristic impedance, means connecting the collector-emitter path of a first transistor between one end of the secondary winding of said first transformer and one end of the secondary winding of said second transformer, means connecting the collector-emitter path of a second transistor between the other end of the secondary winding of said first transformer and the other end of the secondary winding of said second transformer, said first and second transistors being of the same conductivity type, first impedance means equal to said given impedance connecting the collector-emitter path of a third transistor across the secondary winding of said first transformer, second impedance means also equal to said given impedance connecting the collector-emitter path of a fourth transistor across the secondary winding of said second transistor, said third and fourth transistors each being of opposite conductivity type to said first and second transistors, means for applying the same reference potential to the base electrodes of each of said transistors, and means for applying a control potential to the center taps of the secondary windings of said first and second transformers.

12. In combination, a first and a second pair of terminals each exhibiting a characteristic impedance therebetween, means for coupling the collector-emitter path of a first transistor between one terminal of each pair, means for coupling the collector-emitter path of a second transistor between the other terminals of each pair, means for coupling first and second impedance means, together equal to the characteristic impedance between said first pair of terminals, and first and second oppositely poled unilateral conducting means in series across said first pair of terminals, means for coupling third and fourth impedance means, together equal to the characteristic impedance between said second pair of terminals, and third and fourth unilateral conducting means in series across said second pair of terminals, means for applying a common bias potential to the base electrodes of said first and second transistors and to points between said first and second unilateral conducting means and between said third and fourth unilateral conducting means, and means for coupling a control voltage adapted to vary between a value above said bias potential and a value below said bias potential to each of said terminals.

13. The combination according to claim 12 wherein said bias potential is applied to selectively movable connections dividing said first and second and said third and fourth impedance means.

References Cited in the file of this patent

UNITED STATES PATENTS

| | | |
|---|---|---|
| 2,237,796 | Smith | Apr. 8, 1941 |
| 2,763,840 | Pfleger | Sept. 18, 1956 |
| 2,816,238 | Elliott | Dec. 10, 1957 |
| 2,904,677 | Heidester | Sept. 15, 1959 |